United States Patent
Liu

(10) Patent No.: US 10,374,867 B2
(45) Date of Patent: *Aug. 6, 2019

(54) NETWORK CONFIGURATION ACCESS

(71) Applicant: HEWLETT PACKARD ENTERPRISE DEVELOPMENT LP, Houston, TX (US)

(72) Inventor: Mengwen Liu, Zhejiang (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/122,283

(22) PCT Filed: Feb. 12, 2015

(86) PCT No.: PCT/CN2015/072952
§ 371 (c)(1),
(2) Date: Aug. 29, 2016

(87) PCT Pub. No.: WO2015/127867
PCT Pub. Date: Sep. 3, 2015

(65) Prior Publication Data
US 2016/0373290 A1 Dec. 22, 2016

(30) Foreign Application Priority Data
Feb. 28, 2014 (CN) .......................... 2014 1 0070579

(51) Int. Cl.
*G06F 15/177* (2006.01)
*H04L 12/24* (2006.01)

(52) U.S. Cl.
CPC ...... *H04L 41/0213* (2013.01); *H04L 41/0806* (2013.01); *H04L 41/0843* (2013.01); *H04L 41/28* (2013.01)

(58) Field of Classification Search
CPC ............. H04L 41/0213; H04L 41/0806; H04L 41/0843; H04L 41/28
(Continued)

(56) References Cited

U.S. PATENT DOCUMENTS

2004/0019487 A1  1/2004  Kleindienst et al.
2011/0063972 A1  3/2011  Muley et al.

FOREIGN PATENT DOCUMENTS

CN   101237454 A   8/2008
CN   101795289 A   8/2010
(Continued)

OTHER PUBLICATIONS

International Search Report and Written Opinion, International Application No, PCT/CN2015/072952, dated May 12, 2015, pp. 1-8, SIPO.

(Continued)

*Primary Examiner* — Wing F Chan
*Assistant Examiner* — Joseph R Maniwang
(74) *Attorney, Agent, or Firm* — Hewlett Packard Enterprise Patent Department

(57) ABSTRACT

The present disclosure includes: establishing, by a network management system (NMS), a network configuration protocol (NETCONF) configuration template library including a plurality of configuration templates, based on a network configuration protocol (NETCONF). Each configuration template includes a type of a network device which supports the NETCONF, transport layer protocols which are supported by the network device, and configuration parameters corresponding to each of the transport layer protocols to set up NETCONF sessions of the network device. In response to a network device joining the NMS, searching the NETCONF configuration template library to find a matching NETCONF configuration template which matches a type of
(Continued)

the network device which has joined the NMS. Establishing a NETCONF session with the network device which has joined the NMS, based on a transport layer protocol and corresponding configuration parameters of the matching NETCONF configuration template.

20 Claims, 5 Drawing Sheets

(58) Field of Classification Search
USPC .......................................................... 709/220
See application file for complete search history.

(56) References Cited

FOREIGN PATENT DOCUMENTS

| CN | 101827078 A | 9/2010 |
|---|---|---|
| CN | 102355374 A | 2/2012 |
| CN | 102427409 A | 4/2012 |
| CN | 102891768 A | 1/2013 |
| CN | 102891796 A | 1/2013 |
| CN | 103281197 A | 9/2013 |
| CN | 103368781 A | 10/2013 |
| EP | 2166699 A1 | 3/2010 |

OTHER PUBLICATIONS

International Search Report and Written Opinion received for PCT Application No. PCT/CN2015/072946, dated May 8, 2015, 6 pages.
International Preliminary Report on Patentability received for PCT Patent Application No. PCT/CN2015/072952, dated Sep. 15, 2016, 5 pages.
Extended European Search Report and Written Opinion received for EP Application No. 15754719.1, dated Oct. 24, 2017, 5 pages.
Enns et al., "Network Configuration Protocol (NETCONF)," Request for Comments: 6241, Internet Engineering Task Force (IETF), Jun. 2011, pp. 1-113.

NETWORK CONFIGURATION ACCESS

BACKGROUND

Network Configuration Protocol (NETCONF) is a network management protocol based on the Extensible Markup Language (XML). It may provide a convenient way to configure and manage a network device. The NETCONF allows a network device to provide complete and standardized programming interfaces to the external. The users or third-party application developers may configure parameters for the network device, or retrieve values or statistics from the network device through the interfaces.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
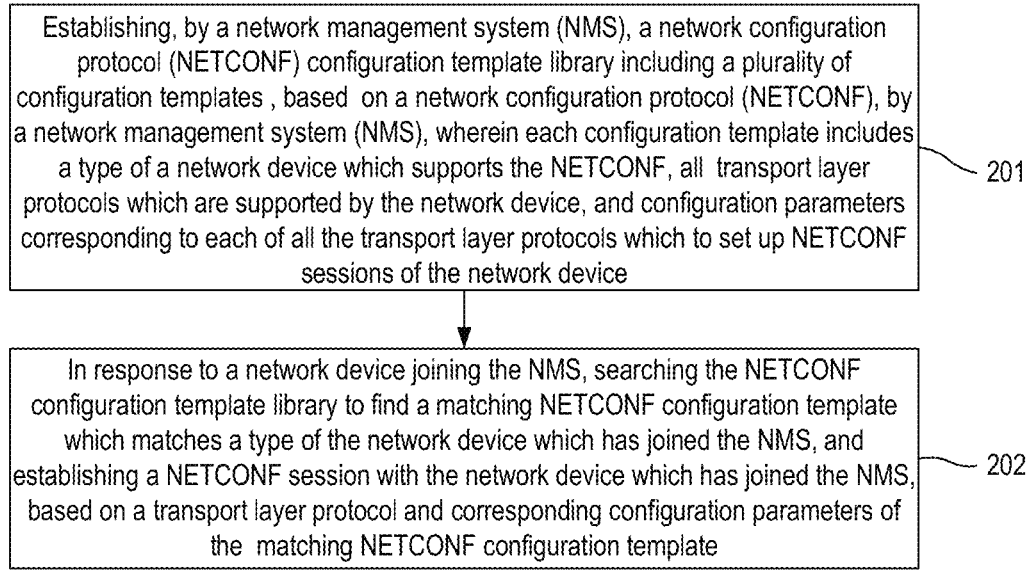
FIG. 1 is a flowchart of network configuration access according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Configuration and information exchange of the NETCONF are based on XML. Comparing with the command line, the Simple Network Management Protocol (SNMP) and other communication interaction, the NETCONF is easier to parse data and information. The transport layer of the NETCONF may be independent to the NETCONF and may support multiple communication connections, such as TELNET, Secure Shell (SSH), CONSOLE, Simple Object Access Protocol (SOAP), and Blocks Extensible Exchange Protocol (BEEP) etc.

The first layer of NETCONF is the secure transport layer. The protocols of the secure transport layer may be independent to the protocols used in upper layers of the NETCONF. The transport layer may provide a corresponding session carrier between the network device and a network management system (NMS).

The protocols supported by the transport layer of the NETCONF include, but are not limited to, the following types:
1) SSH;
2) SOAP;
3) BEEP, wherein the transport layer may use different types of transport layer protocols to establish the NETCONF session, and the configuration parameters for different transport layer protocols may be different. Even with the same transport layer protocol, the configuration parameters may vary greatly when the NETCONF connection is to the network devices which are from different manufacturers. In an example, a NETCONF session is established by using the telnet transport protocol for the network device of company A, the administrator may use the command [xml] to enter into the xml view of the network device of company A. Another NETCONF session is established by using the SSH transport protocol for the network device of company B, and the administrator may use a SSH subsystem [netconf] to log in the network device of company B. Another more NETCONF session is established by using the SOAP transport protocol for the network device of company C, and the administrator may use the path [/soap/netconf/] in the URL to issue HTTP requests of the network device of company C.

It is known that when the network devices of different vendors are accessed by using different transport layer protocols of the NETCONF, the authentication information such as login user name and password, access ports, access paths, subsystems, post-processing command and other parameters may vary in a great diversity. When an administrator uses different transport layer protocols of the NETCONF to interact with the network device, the administrator need to remember and use all of these different configuration paramaters. It is a heavy burden for the user.

Therefore, the maintenance and management of the access configuration information of the transport layer protocol of the NETCONF may become an important issue when the NETCONF is widely used in network management.

The present disclosure provides a method for network configuration access. FIG. 1 is a flowchart of network configuration access according to an example of the present disclosure.

As shown, in block 201, a network management system (NMS) may establish, based on a network configuration protocol (NETCONF), a network configuration protocol (NETCONF) configuration template library. Each configuration template may include a type of a network device which supports the NETCONF, all transport layer protocols which are supported by the network device, and corresponding configuration parameters of all the transport layer protocols which set up NETCONF sessions of the network device. That is, a transport layer protocol may use its corresponding configuration parameters to set up NETCONF session of the network device.

In block 202, the NMS may search the NETCONF configuration template library to find the corresponding NETCONF configuration templates according to the type of the network device which joins the NMS. The NMS may establish the NETCONF sessions with the network device based on the transport layer protocols of the found NETCONF configuration templates and the configuration parameters corresponding to the transport layer protocols.

In a practical application, the NMS may modify the corresponding configuration parameters when a change of any configuration parameter of any NETCONF configuration template has been detected. When the NMS discovers that a specific type network device adds a new NETCONF configuration template, the NMS may add the new NETCONF configuration template to the NETCONF configuration template library. Additionally, when the NMS discovers network devices with new type, the NMS may add a new NETCONF configuration template to the NETCONF configuration template library, wherein the new NETCONF configuration template is corresponding to the network devices with new type.

Figure 2:
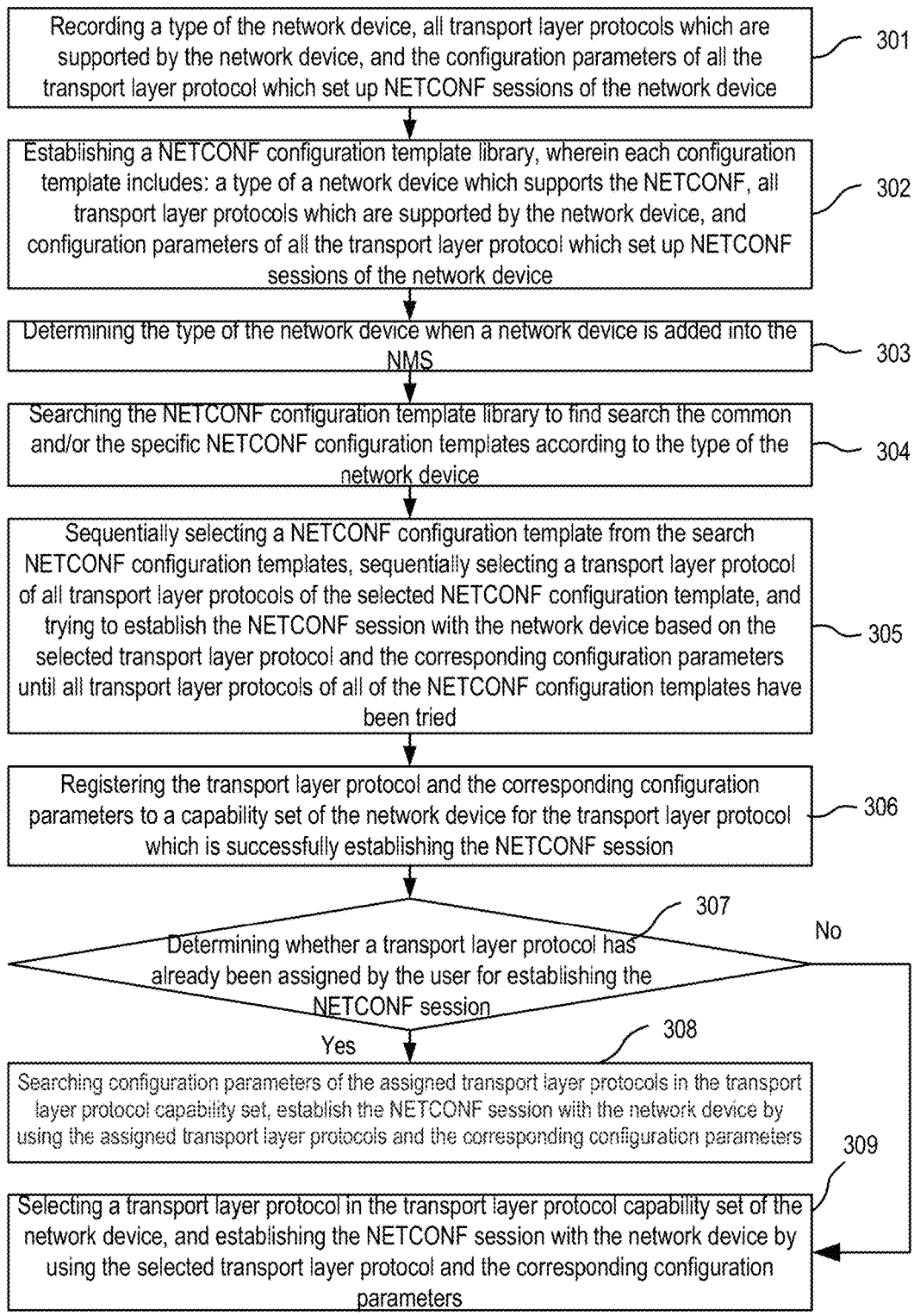
FIG. 2 is a flowchart of network configuration access according to another example of the present disclosure.

FIG. 2 is a flowchart of network configuration access according to another example of the present disclosure.

As shown, in block 301, for each type of network device that supports the NETCONF, the NMS may record the type of the network device, all transport layer protocols which are supported by the network device, and the corresponding configuration parameters of all the transport layer protocol which set up NETCONF sessions of the network device.

The NMS may refer to a system with network management capabilities.

The type of a network device may be the System Object Identification (SysOID), the vendor's name, the model, or the vendor's name and the model.

In an example, in establishing NETCONF session by using the transport layer protocol, the configuration parameters may be the authentication information such as the login user name and the password, the access ports, the access paths, subsystems, post-processing command and other parameters for establishing NETCONF session of each transport layer protocol of the network device, or the carried out type of the aforementioned parameters for establishing NETCONF session by using the transport layer protocol of the NETCONF.

In block 302, the NMS may establish a NETCONF configuration template library. Each configuration template in the NETCONF configuration template library may include a type of a network device which supports the NETCONF, all transport layer protocols which are supported by the network device, and configuration parameters of all the transport layer protocol which set up NETCONF sessions of the network device.

In an example, the configuration template may include a common NETCONF configuration template and a specific NETCONF configuration template. The common NETCONF configuration template may be applicable to all or most of the network devices belonging to the same type. In practical applications, one or a number of network devices which are managed by the NMS may configure with specific configuration parameters other than the configuration parameters of most of these network devices in the same type. For example, specific configuration parameters may be the authentication information and the access ports of the network devices, etc. In this case, the specific NETCONF configuration template may be suitable for the one or the number of network devices.

Figure 3:
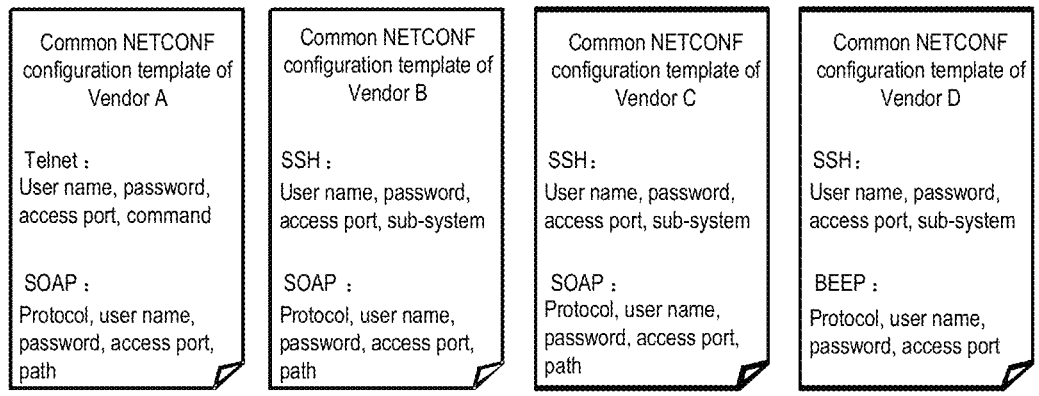
FIG. 3 is a common NETCONF configuration template of a network device according to an example of the present disclosure.
Figure 4:
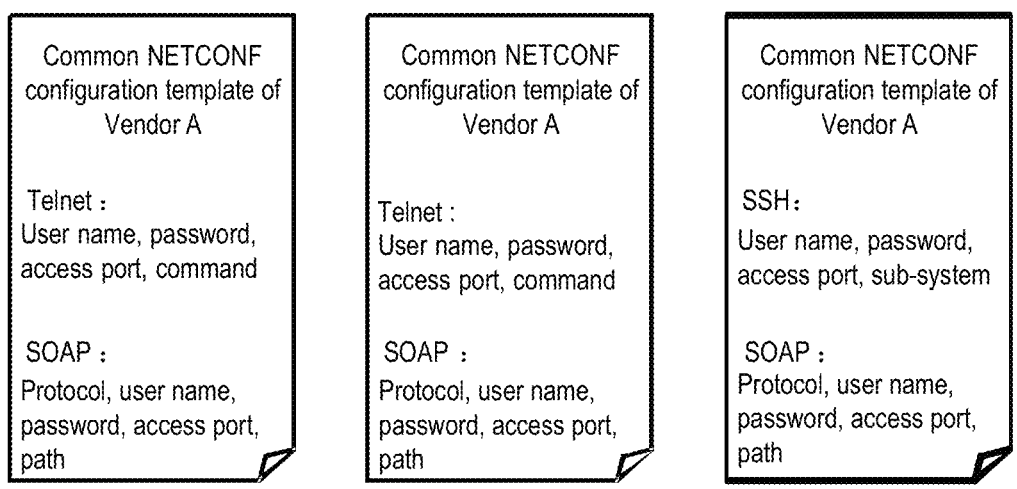
FIG. 4 is a common NETCONF configuration template and two specific NETCONF configuration templates of a network device according to an example of the present disclosure.

FIG. 3 shows a common NETCONF configuration template of a network device according to an example of the present disclosure. As shown in FIG. 3, there are list four common NETCONF configuration templates for the Vendor A, B, C, and D, respectively.

Figure 6:
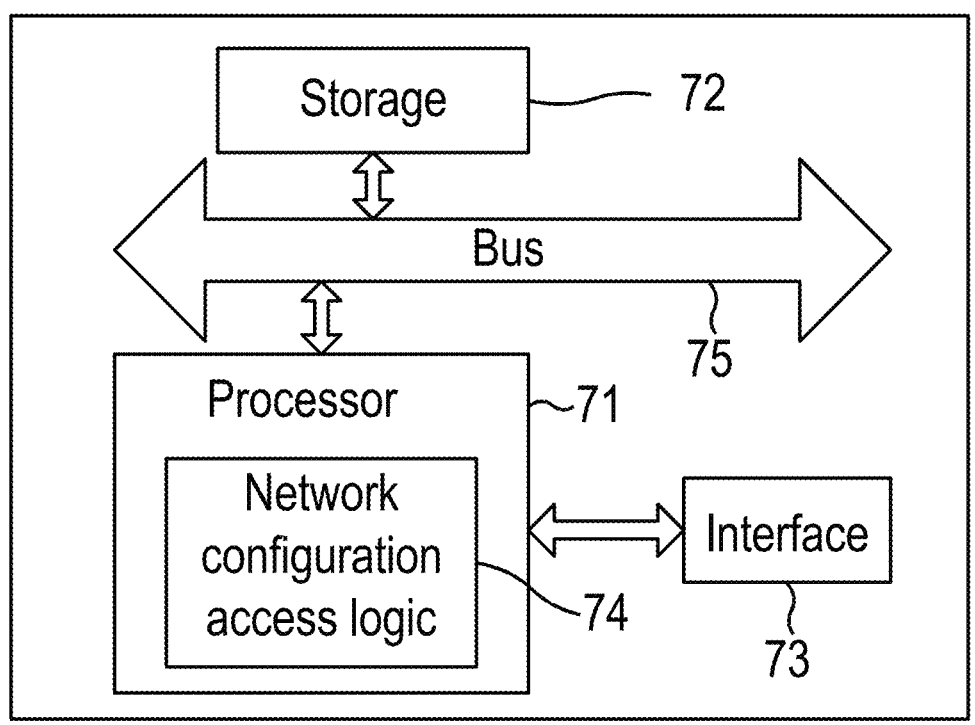
FIG. 6 is a block diagram illustrating part of a server storing a network configuration access logic according to an example of the present disclosure.

FIG. 6 shows a common NETCONF configuration template and two specific NETCONF configuration templates of a network device, according to an example of the present disclosure.

In block 303, when a network device is added into the NMS, the NMS determine the type of the network device.

In an example, the NETCONF configuration template may use the vendor name and/or model to represent a type of the network device. The NMS may recognize the vendor name and/or model of the network device according to the SysOID of the network device.

In block 304, the NMS may search the NETCONF configuration template library to find the corresponding common and/or the corresponding specific NETCONF configuration templates according to the type of the network device.

In block 305, the NMS may sequentially select a NETCONF configuration template from the found NETCONF configuration templates. Furthermore, the NMS may sequentially select a transport layer protocol of all transport layer protocols corresponding to the selected NETCONF configuration template, and try to establish the NETCONF session with the network device based on the selected transport layer protocol and the corresponding configuration parameters until all transport layer protocols of all of the NETCONF configuration templates have been tried.

For a specific type network device, the NETCONF configuration template library of the NMS may have the common NETCONF configuration template and the specific NETCONF configuration template for the specific type network device, wherein each configuration template may contain many types of the transport layer protocol. When a network device is added into the NMS, the NMS may need to search all the transport layer protocols corresponding to the NETCONF configuration templates to detect which transport layer protocols are matched with the network device, and record all matched transport layer protocols and corresponding configuration parameters. In the formal configuration access, the NMS may use the matched transport layer protocols and the corresponding configuration parameters to establish the NETCONF session with the network device, so that the NETCONF session establishment process is more simple and fast.

In block 306, for the transport layer protocol which is successfully establishing the NETCONF session, the NMS may register the transport layer protocol and the corresponding configuration parameters to a transport layer protocol capability set of the network device.

The NETCONF network device of different vendor may have different transport layer protocol. Even though the NETCONF network device of different vendor may support the same transport layer protocol, the configuration parameters corresponding to the transport layer protocol may be different. The purpose of blocks 301 to 306 may be used to detect the different types of the network transport protocols supported by the network device and the configuration parameters of the detected network transport protocols for establishing the NETCONF session. The results may register to the transport layer protocol capability set of the network device. The NMS may directly perform, according to the transport layer protocol capability set, the network configuration access to establish the NETCONF sessions thereafter.

A plurality of types of the transport layer protocol may successfully establish the NETCONF sessions, and the NMS may set up a priority for each transport layer protocol in the transport layer protocol capability set. When a user want to assign a transport layer protocol for a particular or more configuration access contents, the NMS may need to assign the corresponding transport layer protocol for the configuration access contents in the transport layer protocol capability set.

For each type of transport layer protocol failed to establish the NETCONF session, the NMS may mark an "error" for the corresponding transport layer protocol and the configuration parameters to indicate the user to re-establish the configuration parameters for the transport protocol of the network device.

In block 307, the NMS may determine whether a transport layer protocol has already been assigned by the user for establishing the NETCONF session when the NMS performs the network configuration access to the network device by using the NETCONF, if yes, turn to block 308 for processing, and if not, turn to block 309 for processing.

The trigger of the NETCONF network configuration access is the user who uses the NETCONF. When the user of the NETCONF wants to access to a network device, a NETCONF network configuration access request of the network device may be inputted to the NMS by the user. If the user knows the transport layer protocols supported by the network device, the user may assign the transport layer protocols for establishing the NETCONF sessions between the NMS and the network device. If thus, the user may simultaneously input the identification information of the assigned transport layer protocols to the NMS.

In block 308, the NMS may search the configuration parameters of the assigned transport layer protocols in the transport layer protocol capability set, establish the NETCONF session with the network device by using the assigned transport layer protocols and the corresponding configuration parameters, and end the process.

In an example, the user may assign the wrong transport layer protocols, or the corresponding configuration parameters of the transport layer protocols may be changed after the network device has been added into the NMS, which leads to this NETCONF session establishment fails. In this case, the NMS may not use other transport layer protocol in the transport layer protocol capability set to re-establish the NETCONF session again. Instead, the NMS generally may prompt the user that the NETCONF session fails and indicate the reason of the failure.

In block 309, the NMS may select a transport layer protocol in the transport layer protocol capability set of the network device, and may establish the NETCONF session with the network device by using the selected transport layer protocol and the corresponding configuration parameters.

In an example, the transport layer protocol capability set may assign different transport layer protocol for different configuration access content. In this case, the NMS may search the transport layer protocol capability set based on the configuration access content to find a transport layer protocol, and may establish the NETCONF session with the network device by using the found transport layer protocol and the corresponding configuration parameters. Otherwise, the NMS may, randomly or according to priority from high to low, choose a transport layer protocol, and may establish the NETCONF session with the network device by using the chosen transport layer protocol and the corresponding configuration parameters.

In present disclosure, there may be a plurality of configuration access contents, the NMS may find, based on the different configuration access contents, the different specified transport protocols, and may establish the NETCONF sessions with the network device by using the different specified transport protocols and the corresponding configuration parameters.

For blocks 308 and 309, when a network device accessed by the NMS may have not yet joined the NMS, the NMS may not register the transport layer protocol capability set of the network device. In this case, the NMS may search the common NETCONF configuration template/the specific NETCONF configuration template in the NETCONF configuration template library according to the type of the network device to find the corresponding NETCONF configuration templates matched with the network device. Then, the NMS sequentially select a transport layer protocol of the found NETCONF configuration templates, and try to establish the NETCONF session with the network device based on the select transport layer protocol and the corresponding configuration parameters, until successfully establishing the NETCONF session.

In a practical application, the user may add the new NETCONF configuration template for the new network device, or add the specific NETCONF configuration template for the existing network device into the NETCONF configuration template library, also modify the configuration parameters of the existing common NETCONF configuration template and/or the specific NETCONF configuration template of the NETCONF configuration template library. After the addition of NETCONF configuration template or the modification of the configuration parameters are completed, the NMS may manually perform the NETCONF session connection by using the new added or modified NETCONF configuration templates to test the new added or modified NETCONF configuration templates are available or not.

Based on the aforementioned examples, it is known that the advantages of the present disclosure are as follows:
1) The implementation of centralized management of transport layer protocol configuration: The NMS may establish the NETCONF configuration template library, wherein the NETCONF configuration template library may have the common NETCONF configuration templates and/or the specific NETCONF configuration template for each type of the network device. Thus, the NMS may provide a common and unified network configuration method of the transport layer protocol for different NETCONF users.
2) The implementation of automatic detection of transport layer protocol capability: After a network device is registered into the NMS, the NMS may immediately or periodically establish the NETCONF sessions according the configuration parameters of each transport layer protocol of the common NETCONF configuration templates and/or the specific NETCONF configuration template of the NETCONF configuration template library. Thus, the NMS may automatically detect which transport layer protocols and the corresponding configuration parameters of the NETCONF configuration template library are matched with the network device, and may record all matched transport layer protocols and the corresponding configuration parameters to the transport layer protocol capability set of the network device.
3) The convenience of selection and application of the transport layer protocol: After registering matched transport layer protocols and the corresponding configuration parameters to the transport layer protocol capability set, the NMS may directly establish the NETCONF session by selecting the transport layer protocols and the corresponding configuration parameters from the transport layer protocol capability set. Thus, the NMS may provide a simple way of selection and application of the transport layer protocol, without the users pay attention to diverse configuration methods and complex configuration parameters.

Figure 5:
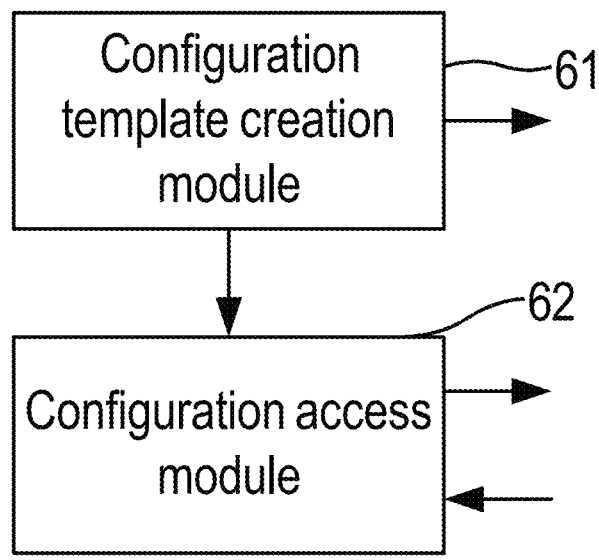
FIG. 5 is a schematic construction diagram of a network configuration access logic according to an example of the present disclosure.

Corresponding to the above method, in FIG. 5, the present disclosure may also provide a network configuration access logic. As shown in FIG. 5, the network configuration access logic may include a configuration template creation module 61 and a configuration access module 62 according to the functionality.

The configuration template creation module 61 may establish a network configuration protocol (NETCONF) configuration template library. Each configuration template may include a type of a network device which supports the NETCONF, all transport layer protocols which are supported by the network device, and the configuration parameters of all the transport layer protocol which set up the NETCONF sessions of the network device.

The configuration access module 62 may search the NETCONF configuration template library which is established by the configuration template creation module 61 to find search NETCONF configuration templates according to the type of the network device which joins the NMS, and establish the NETCONF sessions with the network device based on the transport layer protocols of the found NETCONF configuration templates and the corresponding configuration parameters.

In the establishment of the NETCONF sessions with the network device based on the transport layer protocols of the found NETCONF configuration templates and the corresponding configuration parameters, the configuration access module 62 may try to establish the NETCONF sessions with the network device based on the transport layer protocols and the corresponding configuration parameters for each of the transport layer protocols of each search NETCONF configuration template.

The configuration access module 62 may register the transport layer protocol and the corresponding configuration parameters to a transport layer protocol capability set of the network device, in which the registered transport layer protocol is successfully establishing the NETCONF session.

For each type of transport layer protocol failed to establish a NETCONF session, the configuration access module 62 may mark the transport layer protocol and the corresponding configuration parameters of un-successfully establishing the NETCONF session to indicate a user to re-establish the configuration parameters for the transport protocol.

The configuration access module 62 may further select a transport layer protocol from the transport layer protocol capability set, and use the selected transport layer protocol and its corresponding configuration parameters to establish the NETCONF session with the network device when the network device is accessed by the configuration access module 62.

Before the selection of a transport layer protocol from the transport layer protocol capability set, the configuration access module 62 may determine whether a transport layer protocol has already been assigned by the user for establishing the NETCONF session. If the transport layer protocol has already been assigned for establishing the NETCONF session, the configuration access module 62 may search the corresponding configuration parameters of the assigned transport layer protocol in the transport layer protocol capability set and may establish the NETCONF session with the network device. Otherwise, the configuration access module 62 may perform the selection of a transport layer protocol from the transport layer protocol capability set.

Additionally, before the selection of a transport layer protocol from the transport layer protocol capability set, the configuration access module 62 may determine whether the transport layer protocol capability set of the network device has been already registered in the configuration access module 62. If yes, the configuration access module 62 may perform the selection of the transport layer protocol from the transport layer protocol capability set. Otherwise, the configuration access module 62 may search the NETCONF configuration template library according to the type of the network device to find search NETCONF configuration templates. Thus, the configuration access module 62 may sequentially establish the NETCONF session with the network device based on the transport layer protocols of the found NETCONF configuration template and the corresponding configuration parameters, until successfully establishing the NETCONF session.

In the selection of a transport layer protocol from the transport layer protocol capability set, the configuration access module 62 may find, according to a configuration access content, an assigned transport layer protocol in the transport layer protocol capability set, or may select the transport layer protocol in the transport layer protocol capability set in accordance with a priority of each transport layer protocol from high priority to low priority.

During the establishment of the NETCONF configuration template library, the configuration template creation module 61 may modify the corresponding configuration parameters when a change of any configuration parameter of any NETCONF configuration template has been detected. Additionally, the configuration template creation module 61 may add a new NETCONF configuration template to the NETCONF configuration template library when the configuration template creation module 61 discovers that a specific type network device adds the new NETCONF configuration template. The configuration template creation module 61 may also add a new NETCONF configuration template to the NETCONF configuration template library when the configuration template creation module 61 discovers that a new type network device has been added in to the NMS, wherein the new NETCONF configuration template is corresponding to the new type network device.

FIG. 8 is an example of a block diagram illustrating part of a server storing the network configuration access logic, according to an example of the present disclosure. In this example, the network configuration access logic is implemented by software. The server may typically include a processor 71 and a storage 72, wherein the storage 72 is accessible by the processor 71 through the internal bus 75. The storage 72 may be a volatile or non-volatile memory or storage media including by way of example semiconductor memory devices, e.g., EPROM, EEPROM, DRAM and flash memory devices; magnetic disks, e.g., internal hard disks or removable disks; magneto optical disks; and CD ROM and DVD-ROM disks. Moreover, the server may include other hardware components, i.e., communication interface 73 for transmitting and receiving data.

As shown in FIG. 8, the network configuration access logic may be the machine readable instructions which are stored in the storage 72. The processor 71 may read the machine readable instructions and execute machine readable instructions. According to the machine readable instructions, the processor 71 may establish a network configuration protocol (NETCONF) configuration template library. Each configuration template may include a type of a network device which supports the NETCONF, all transport layer protocols which are supported by the network device, and the configuration parameters of all the transport layer protocol which set up NETCONF sessions of the network device.

The processor 71 may search the NETCONF configuration template library to find the corresponding NETCONF configuration templates according to the type of the network device which joins the NMS, and may establish the NETCONF sessions with the network device based on the transport layer protocols of the search NETCONF configuration templates and the corresponding configuration parameters.

Further, in the establishment of the NETCONF sessions with the network device based on the transport layer protocols of the found NETCONF configuration templates and the corresponding configuration parameters, the processor 71 may try to, according to the the machine readable instructions, establish the NETCONF sessions with the network device based on the transport layer protocols and the corresponding configuration parameters for each of the transport layer protocols corresponding to each of the found NETCONF configuration templates. The processor 71 may register the transport layer protocol and the corresponding configuration parameters to a transport layer protocol capability set of the network device, in which the registered transport layer protocol is successfully establishing the NETCONF session. The processor 71 may mark the transport layer protocol and the corresponding configuration parameters of un-successfully establishing the NETCONF session to indicate a user to re-establish the configuration parameters for the transport protocol when the transport layer protocol fails to establish a NETCONF session.

The processor 71 may further select, according to the the machine readable instructions, a transport layer protocol from the transport layer protocol capability set, and use the selected transport layer protocol and its corresponding configuration parameters to establish the NETCONF session with the network device when the network device is accessed by the processor 71.

Before the selection of a transport layer protocol from the transport layer protocol capability set, the processor 71 may determine, according to the the machine readable instructions, whether a transport layer protocol has already been assigned by the user for establishing the NETCONF session. If the transport layer protocol has already been assigned for establishing the NETCONF session, the processor 71 may search the configuration parameters of the assigned transport layer protocol in the transport layer protocol capability set, and may establish the NETCONF session with the network device. Otherwise, the processor 71 may perform the selection of a transport layer protocol from the transport layer protocol capability set.

Futhermore, before the selection of a transport layer protocol from the transport layer protocol capability set, the processor 71 may determine, according to the the machine readable instructions, whether the transport layer protocol capability set of the network device has been already registered in the processor 71. If yes, the processor 71 may perform the selection of the transport layer protocol from the transport layer protocol capability set. Otherwise, the processor 71 may search the NETCONF configuration template library according to the type of the network device to find search NETCONF configuration templates, and then may sequentially establish the NETCONF session with the network device based on the transport layer protocols of the search NETCONF configuration template and the corresponding configuration parameters, until successfully establishing the NETCONF session.

In the selection of a transport layer protocol from the transport layer protocol capability set, the processor 71 may find, according to a configuration access content, an assigned transport layer protocol in the transport layer protocol capability set, or may select the transport layer protocol in the transport layer protocol capability set in accordance with a priority of each transport layer protocol from high priority to low priority.

During the establishment of the NETCONF configuration template library, the processor 71 may modify, according to the the machine readable instructions, the corresponding configuration parameters when a change of any configuration parameter of any NETCONF configuration template has been detected. the processor 71 may also add a new NETCONF configuration template to the NETCONF configuration template library when the processor 71 discovers that a specific type network device has added the new NETCONF configuration template or may add a new NETCONF configuration template to the NETCONF configuration template library when the processor 71 discovers that a new type network device, wherein the new NETCONF configuration template is corresponding to the new type network device.

From the above described examples, it is clear that the present disclosure may be implemented by software plus a necessary general hardware platform. That is, the machine-readable instructions execute on a general hardware platform. Certainly, it may also implemented by hardware. Based on this understanding, the technology of the present disclose may be embodied in the form of a software product. The computer software product is stored in a storage medium, and the computer software product includes a number of instructions to make an terminal device, such as a mobile phone, a personal computer, a server, or network equipment, etc., to execute the method according to the examples of the present disclosure.

The above are the preferred examples of the present disclosure is not intended to limit the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are the illustrations of an example, wherein the units or procedure shown in the figures are not necessarily essential for implementing the present disclosure. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or block, or group of elements, integers or blocks, but not the exclusion of any other element, integer or step, or group of elements, integers or blocks.

It will be appreciated that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for network configuration access, comprising:
    establishing, by a network management system (NMS), a network configuration protocol (NETCONF) configuration template library including a plurality of configuration templates, based on a network configuration protocol (NETCONF), wherein each configuration template includes a type of a network device which supports the NETCONF, transport layer protocols which are supported by the network device, and configuration parameters corresponding to each of the transport layer protocols to set up NETCONF sessions of the network device; and
    in response to a network device joining the NMS, searching the NETCONF configuration template library to find a matching NETCONF configuration template which matches a type of the network device which has joined the NMS, and establishing a NETCONF session with the network device which has joined the NMS, based on a transport layer protocol and corresponding configuration parameters of the matching NETCONF configuration template.

2. The method of claim 1, wherein the matching NETCONF configuration template includes a plurality of transport layer protocols, and
    wherein the establishing of the NETCONF session with the network device comprises:
        trying to establish the NETCONF session with the network device based on the transport layer protocols and corresponding configuration parameters for each of the transport layer protocols of the matching NETCONF configuration template;
        registering, to a transport layer protocol capability set of the network device, a transport layer protocol that successfully established the NETCONF session and corresponding configuration parameters, the transport layer protocol that successfully establishes the NETCONF session being of the plurality of transport layer protocols; and
        marking a transport layer protocol that failed to establish the NETCONF session and corresponding configuration parameters to indicate a user to re-establish configuration parameters for the transport protocol that failed to establish the NETCONF session.

3. The method according to claim 1, wherein the method further comprises:
    selecting a transport layer protocol from a transport layer protocol capability set and using the selected transport layer protocol and configuration parameters corresponding to the selected transport layer protocol to establish the NETCONF session with the network device when the network device is accessed by the NMS.

4. The method according to claim 3, before the selection of a transport layer protocol from the transport layer protocol capability set when the NMS accesses the network device, the method further comprising:
    determining whether a transport layer protocol has already been assigned by the user for establishing the NETCONF session, and
    if the transport layer protocol has already been assigned for establishing the NETCONF session, searching the configuration parameters of the assigned transport layer protocol in the transport layer protocol capability set and establishing the NETCONF session with the network device; and
    if the transport layer protocol has not already been assigned for establishing the NETCONF session, performing the selection of a transport layer protocol from the transport layer protocol capability set.

5. The method according to claim 3, before the selection of a transport layer protocol from the transport layer protocol capability set when the NMS accesses the network device, the method further comprising:
    determining whether the transport layer protocol capability set of the network device has been already registered in the NMS;
    if the transport layer protocol capability set of the network device is determined to be already registered in the NMS, performing the selection of the transport layer protocol from the transport layer protocol capability set; and
    if the transport layer protocol capability set of the network device is determined to not be already registered in the NMS, searching the NETCONF configuration template library according to the type of the network device to find NETCONF configuration templates, then sequentially establishing the NETCONF session with the network device based on the transport layer protocols of found NETCONF configuration templates and the corresponding configuration parameters, until successfully establishing the NETCONF session.

6. The method according to claim 3, wherein the selecting the transport layer protocol from the transport layer protocol capability set comprises:
    finding an assigned transport layer protocol in the transport layer protocol capability set according to configuration access content, or selecting the transport layer protocol in the transport layer protocol capability set in accordance with a priority of each transport layer protocol from high priority to low priority.

7. The method according to claim 1, wherein the establishment of the NETCONF configuration template library by the NMS also includes:
    modifying the corresponding configuration parameters by the NMS when a change of any configuration parameter of any NETCONF configuration template has been detected;
    adding a new NETCONF configuration template to the NETCONF configuration template library when the NMS discovers that a specific type network device has added the new NETCONF configuration template; and
    adding a new NETCONF configuration template to the NETCONF configuration template library when the NMS discovers network devices with new type, wherein the new NETCONF configuration template is corresponding to the network devices with new type.

8. A non-transitory computer readable storage medium on which is stored machine readable instructions that when executed by a processor cause the processor to:
establish a network configuration protocol (NETCONF) configuration template library including a plurality of configuration templates, wherein each configuration template includes: a type of a network device which supports the NETCONF, transport layer protocols which are supported by the network device, and configuration parameters of the transport layer protocols to set up NETCONF sessions of the network device; and
search the NETCONF configuration template library to find a matching NETCONF configuration template including a type of a network device which matches a type of the network device which has joined the NMS, and establish a NETCONF session with the network device which has joined the NMS, based on a transport layer protocol of the matching NETCONF configuration template and configuration parameters corresponding to the transport layer protocol.

9. The non-transitory computer readable storage medium according to claim 8, wherein the machine readable instructions are further to cause the processor to:
try to establish the NETCONF session with the network device based on the transport layer protocol of the matching NETCONF configuration template and the configuration parameters corresponding to the transport layer protocol;
if the transport layer protocol successfully establishes the NETCONF session, register the transport layer protocol and the corresponding configuration parameters to a transport layer protocol capability set of the network device; and
if the transport layer protocol is unsuccessful at establishing the NETCONF session, mark the transport layer protocol and the corresponding configuration parameters to indicate a user to re-establish the configuration parameters for the transport layer protocol.

10. The non-transitory computer readable storage medium according to claim 8, wherein the machine readable instructions are further to cause the processor to:
select a transport layer protocol from a transport layer protocol capability set and use the selected transport layer protocol and configuration parameters corresponding to the selected transport layer protocol to establish the NETCONF session with the network device when accessing the network device.

11. The non-transitory computer readable storage medium according to claim 10, wherein the machine readable instructions are further to cause the processor to:
determine whether a transport layer protocol has already been assigned by the user for establishing the NETCONF session;
if the transport layer protocol has already been assigned for establishing the NETCONF session, search the corresponding configuration parameters of the transport layer protocol in the transport layer protocol capability set and establish the NETCONF session with the network device; and
if the transport layer protocol has not already been assigned for establishing the NETCONF session, perform the selection of a transport layer protocol from the transport layer protocol capability set.

12. The non-transitory computer readable storage medium according to claim 10, wherein the machine readable instructions are further to cause the processor to:
determine whether the transport layer protocol capability set of the network device has been already registered in the NMS;
if the transport layer protocol capability set of the network device is determined to be already registered in the NMS, perform the selection the transport layer protocol from the transport layer protocol capability set; and
if the transport layer protocol capability set of the network device is determined to not be already registered in the NMS, search the NETCONF configuration template library according to the type of the network device to find NETCONF configuration templates, then sequentially establish the NETCONF session with the network device based on the transport layer protocols of found NETCONF configuration templates and the configuration parameters, until the NETCONF session has successfully established.

13. The non-transitory computer readable storage medium according to claim 10, wherein the machine readable instructions are further to cause the processor to:
find an assigned transport layer protocol in the transport layer protocol capability set according to configuration access content, or select the transport layer protocol in the transport layer protocol capability set in accordance with a priority of each transport layer protocol from high priority to low priority.

14. The non-transitory computer readable storage medium according to claim 8, wherein the machine readable instructions are further to cause the processor to:
modify the corresponding configuration parameters by the NMS when a change of any configuration parameter of any NETCONF configuration template has been detected;
add a new NETCONF configuration template to the NETCONF configuration template library when the NMS discovers that a specific type network device has added the new NETCONF configuration template; and
add a new NETCONF configuration template to the NETCONF configuration template library when the NMS discovers network devices with new type, wherein the new NETCONF configuration template is corresponding to the network devices with new type.

15. A system comprising:
a processor; and
storage storing machine readable instructions that, when executed by the processor, cause the processor to:
establish a network configuration protocol (NETCONF) configuration template library including a plurality of configuration templates, wherein each configuration template includes: a type of a network device which supports the NETCONF, transport layer protocols which are supported by the network device, and configuration parameters of the transport layer protocols to set up NETCONF sessions of the network device; and
search the NETCONF configuration template library to find a matching NETCONF configuration template including a type of a network device which matches a type of the network device which has joined the NMS, and establish a NETCONF session with the network device which has joined the NMS, based on a transport layer protocol of the matching NET- CONF configuration template and configuration parameters corresponding to the transport layer protocol.

16. The system of claim 15, wherein the machine readable instructions, when executed by the processor, cause the processor to:
   try to establish the NETCONF session with the network device based on the transport layer protocol of the matching NETCONF configuration template and the configuration parameters corresponding to the transport layer protocol;
   if the transport layer protocol successfully establishes the NETCONF session, register the transport layer protocol and the corresponding configuration parameters to a transport layer protocol capability set of the network device; and
   if the transport layer protocol is unsuccessful at establishing the NETCONF session, mark the transport layer protocol and the corresponding configuration parameters to indicate a user to re-establish the configuration parameters for the transport layer protocol.

17. The system of claim 15, wherein the machine readable instructions, when executed by the processor, cause the processor to:
   select a transport layer protocol from a transport layer protocol capability set and use the selected transport layer protocol and configuration parameters corresponding to the selected transport layer protocol to establish the NETCONF session with the network device when accessing the network device.

18. The system of claim 17, wherein the machine readable instructions, when executed by the processor, cause the processor to:
   determine whether a transport layer protocol has already been assigned by the user for establishing the NETCONF session;
   if the transport layer protocol has already been assigned for establishing the NETCONF session, search the corresponding configuration parameters of the transport layer protocol in the transport layer protocol capability set and establish the NETCONF session with the network device; and
   if the transport layer protocol has not already been assigned for establishing the NETCONF session, perform the selection of a transport layer protocol from the transport layer protocol capability set.

19. The system of claim 17, wherein the machine readable instructions, when executed by the processor, cause the processor to:
   determine whether the transport layer protocol capability set of the network device has been already registered in the NMS;
   if the transport layer protocol capability set of the network device is determined to be already registered in the NMS, perform the selection the transport layer protocol from the transport layer protocol capability set; and
   if the transport layer protocol capability set of the network device is determined to not be already registered in the NMS, search the NETCONF configuration template library according to the type of the network device to find NETCONF configuration templates, then sequentially establish the NETCONF session with the network device based on the transport layer protocols of found NETCONF configuration templates and the corresponding configuration parameters, until the NETCONF session has successfully established.

20. The system of claim 15, wherein the machine readable instructions, when executed by the processor, cause the processor to:
   modify the corresponding configuration parameters by the NMS when a change of any configuration parameter of any NETCONF configuration template has been detected;
   add a new NETCONF configuration template to the NETCONF configuration template library when the NMS discovers that a specific type network device has added the new NETCONF configuration template; and
   add a new NETCONF configuration template to the NETCONF configuration template library when the NMS discovers network devices with new type, wherein the new NETCONF configuration template is corresponding to the network devices with new type.

* * * * *